United States Patent [19]

Shimizu

[11] Patent Number: 6,000,889

[45] Date of Patent: Dec. 14, 1999

[54] THERMAL CHANGE COMPUTATION APPARATUS FOR MACHINE TOOL AND STORAGE MEDIUM FOR EXECUTING THE COMPUTATION

[75] Inventor: Kimihiro Shimizu, Toyoake, Japan

[73] Assignee: Brother Kogyo Kabushiki Kaisha, Nagoya, Japan

[21] Appl. No.: 09/126,417

[22] Filed: Jul. 30, 1998

[30] Foreign Application Priority Data

| Aug. 6, 1997 | [JP] | Japan | 9-211922 |
| Aug. 6, 1997 | [JP] | Japan | 9-211923 |
| Sep. 25, 1997 | [JP] | Japan | 9-260390 |

[51] Int. Cl.$^6$ .................................................... B23C 1/30
[52] U.S. Cl. ............................................ 409/135; 409/80
[58] Field of Search ....................... 364/474.19; 409/135, 409/80; 451/7, 5; 82/900

[56] References Cited

U.S. PATENT DOCUMENTS

| 3,735,157 | 5/1973 | Whetham | 409/80 |
| 4,533,858 | 8/1985 | Tlaker | 82/900 |
| 5,619,414 | 4/1997 | Ishii | 364/474.17 |
| 5,623,857 | 4/1997 | Sakuraba | 409/135 |
| 5,779,405 | 7/1998 | Aiso et al. | 409/135 |

FOREIGN PATENT DOCUMENTS

| A-62-88548 | 4/1987 | Japan . |
| 8-298866 | 11/1996 | Japan . |

*Primary Examiner*—Andrea L. Pitts
*Assistant Examiner*—Adesh Bhargava
*Attorney, Agent, or Firm*—Oliff & Berridge, PLC

[57] ABSTRACT

In a machine tool having a main shaft, a thermal change amount between two sampling times is computed on the basis of the movement distance of the main shaft during a period from time 0 to time 1a. After thermal change amounts are computed, a total thermal change amount which results from adding these thermal change amounts is computed. Since the thermal change amount is based on the movement distances (driving states) that are detected at the respective time points and the influence of the thermal change amounts that has been computed previously are added to the computed thermal change amount, it is possible to compute the total thermal change amount corresponding to the driving states at the respective time points.

25 Claims, 13 Drawing Sheets

PITCH ERROR CORRECTION DATA TABLE

| CORRECTION POINT | X-axis CORRECTION | Y-axis CORRECTION | Z-axis CORRECTION |
|---|---|---|---|
| 1 | 0 | -2 | 6 |
| 2 | -2 | -2 | 4 |
| 3 | -4 | -2 | 4 |
| 4 | -2 | 6 | 0 |
| 5 | 0 | 6 | 4 |
| 6 | -2 | -2 | -2 |
| 7 | 0 | 0 | -2 |
| ⋮ | ⋮ | ⋮ | ⋮ |
| n-1 | 0 | 0 | 0 |
| n | 0 | 0 | 0 |

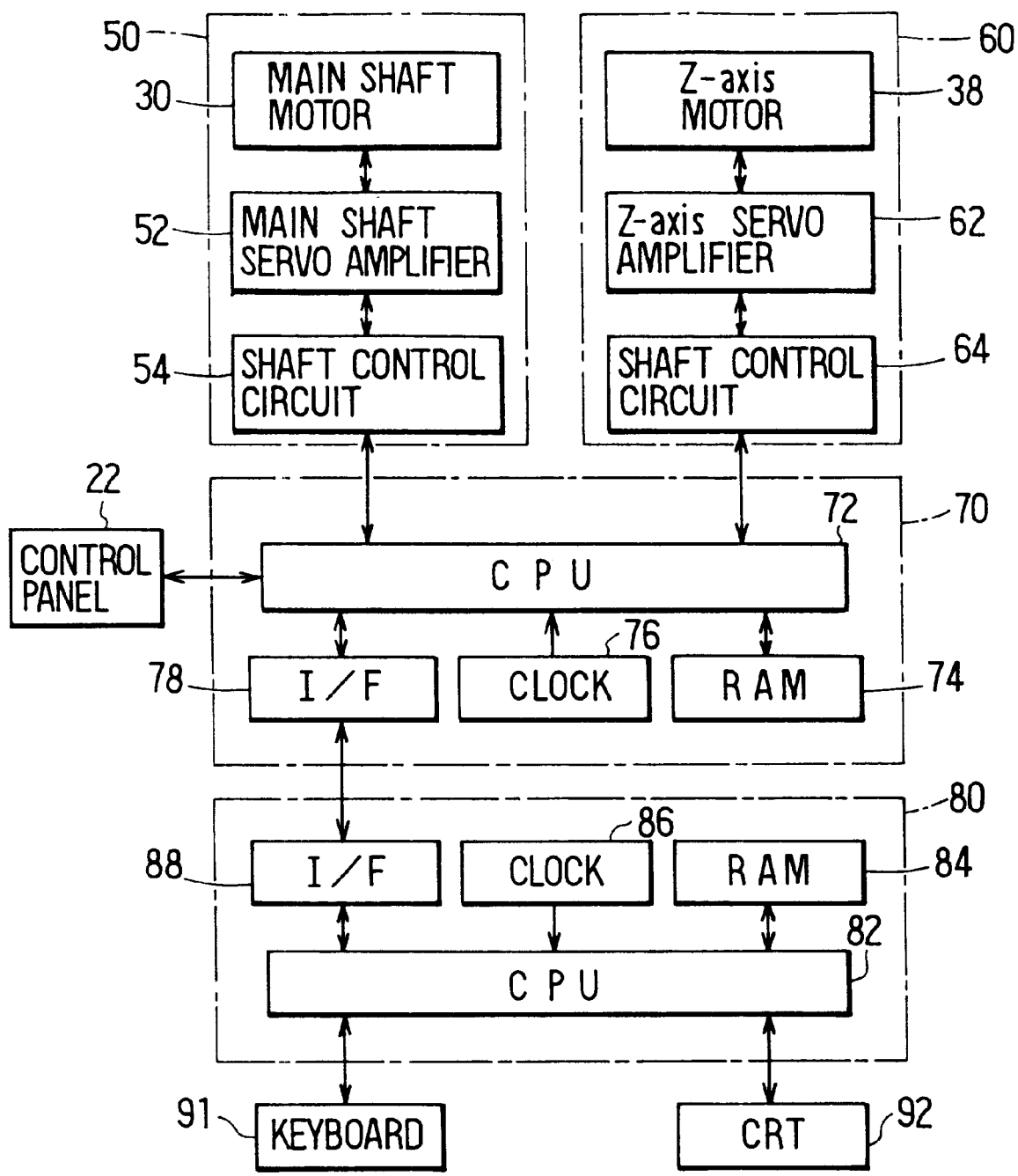

THERMAL CHANGE COMPUTATION APPARATUS FOR MACHINE TOOL AND STORAGE MEDIUM FOR EXECUTING THE COMPUTATION

CROSS REFERENCE TO RELATED APPLICATION

This application relates to and incorporates herein by reference Japanese Patent Applications No. 9-211922, No. 9-211923 and No. 9-260390 filed on Aug. 6, 1997, Aug. 6, 1997 and Sep. 25, 1997, respectively.

BACKGROUND OF THE INVENTION

1. Field of the Invention

The present invention relates to a machine tool thermal change computation apparatus for use with a machine tool to compute a thermal change amount generated in the machine tool and a storage medium for storing a program for such a thermal change computation.

2. Description of Related Art

Machine tools include generally a machining mechanism for cutting or drilling a workpiece and assembling product component parts on a base plate, and a driving mechanism for changing a relative position between the machining mechanism and a workpiece. In general, machine tools for cutting a workpiece or the like include a holding mechanism for holding tools such as drills and taps, a main driving mechanism for rotating tools held on the holding mechanism, an X-axis feed mechanism for feeding tools in the X-axis direction, a Y-axis feed mechanism for feeding tools in the Y-axis direction, a Z-axis feed mechanism for feeding tools in the Z-axis direction, an electronic control apparatus for controlling these feed mechanisms and the like.

For example, as shown in FIG. 18, a machine tool 10 includes a splash guard 12 for preventing cut wastes from splashing. In the inside of the splash guard 12, there are disposed a table 14 for holding a workpiece (not shown), an automatic tool change (ATC) magazine 16 for changing tools such as drills and taps, a machine tool body 20 and the like. The splash guard 12 includes a control panel 22, a work change opening 24 for loading or ejecting a workpiece and an inspection hatch 26 used mainly for maintenance and the like.

As shown in FIG. 19, the body 20 includes a main shaft 28 for holding tools such as drills and taps, a main shaft motor 30 for rotating the main shaft 28, a ball thread mechanism 36 which comprises a nut unit 32 housing a number of steel balls and which is fixed to the main shaft side and a ball thread 34 inserted into the nut unit 32, a Z-axis motor 38 for rotating the ball thread 34, a guide rail 40 disposed in parallel with the ball thread 34, a slide 42 for coupling the guide rail 40 and the main shaft 28 or the like.

In this body 20, the ball thread mechanism 36 and the Z-axis motor 38 constitute the Z-axis feed mechanism for feeding the main shaft 28 in the Z-axis direction (up-down direction in FIG. 15). When the Z-axis motor 38 rotates the ball thread 34, the main shaft 28 is moved in the Z-axis direction. Moreover, the table 14 shown in FIG. 14 may be moved in the X-axis direction and Y-axis direction. As the main shaft 28 may be moved in the Z-axis direction, relative positions among a workpiece and tools in the X-axis, Y-axis and Z-axis directions may be changed.

In this type of machine tool, as the ball thread mechanism 36 is operated, a frictional heat is generated and the ball thread 34 expands. Also in other mechanisms, a thermal change occurs due to the heat thus generated. When such thermal change occurs in the Z-axis direction, for example, an error occurs in a depth of flute and a height of stepped portion formed on a workpiece. If a tolerance is sufficiently larger than a thermal change amount, then a machining error caused by such thermal change is negligible. If not, such a thermal change should be corrected.

Therefore, there is provided a thermal change amount computation apparatus for computing a thermal change amount of a machine tool. In this computation apparatus, when a drive mechanism is controlled in accordance with a previously-determined work program, the drive mechanism is controlled while a machining error is corrected in response to the computed thermal change amount (JP-A-62-88548).

However, in this machine tool thermal change amount computation apparatus, since the thermal change amount is continuously computed during the machine tool is operated, a system for executing such computation processing should be operated constantly as well, resulting in an increase in the computation processing load.

In view of the fact that a heat generated amount and a heat radiated amount are placed in the equilibrium state as the temperature rises during a machine tool is continuously operated, a method of computing a thermal change amount is proposed in JP application No. 8-298866 by the same assignee as the present application. That is, during a period in which the machine tool is operated, a thermal change amount at each timing point is computed based on a saturated thermal change amount (thermal change amount in the equilibrium state) and a machine tool driving time. When the computed thermal change amount becomes nearly equal to the saturated thermal change amount, the value of the saturated thermal change amount will be used as the thermal change amount. In this case, if an accurate saturated thermal change amount is given, a thermal change amount at each timing point may be computed thus reducing a computation processing load.

However, in the above machine tool thermal change amount computation apparatus, a thermal change amount computation accuracy is lowered a little in the case where a machine tool operating program includes a step for driving a machine tool at a high speed and step for driving a machine tool at a low speed. If the saturated thermal change amount is fixed relative to an average driving speed, it is unavoidable that the above computation method computes a thermal change amount as a smaller thermal change amount in step of driving a machine tool at a high speed and computes a thermal change amount as a larger thermal change amount in step of driving a machine tool at a low speed.

SUMMARY OF THE INVENTION

It is therefore an object of the present invention to provide a machine tool thermal change amount computation apparatus which computes a thermal change amount accurately irrespective of changes in operating state of a machine tool.

It is another object of the present invention to provide a storage medium which provides a program for realizing such a computation accurately.

According the first aspect of the present invention, a driving state detecting unit detects a driving state of a machine tool, and a change amount computing unit computes a machine tool thermal change amount based on the detected driving state at every predetermined time or at every predetermined driving amount of the machine tool.

Although the thermal change amount computed at each timing point will progressively decrease, this may affect the computation of the succeeding thermal change amount. Therefore, when the thermal change amount computing unit computes a thermal change amount previously, an influence of such thermal change amount is added to a computed new thermal change amount to provide a present machine tool thermal change amount. Accordingly, it is possible to compute a thermal change amount accurately even when a work program is changed.

BRIEF DESCRIPTION OF THE DRAWINGS

Other objects, features and advantages of the present invention will become more apparent from the following detailed description made with reference to the accompanying drawings. In the accompanying drawings:

FIG. 7 is a block diagram showing a machine tool control system according to a second embodiment of the present invention;

DETAILED DESCRIPTION OF THE PREFERRED EMBODIMENT

Figure 18:
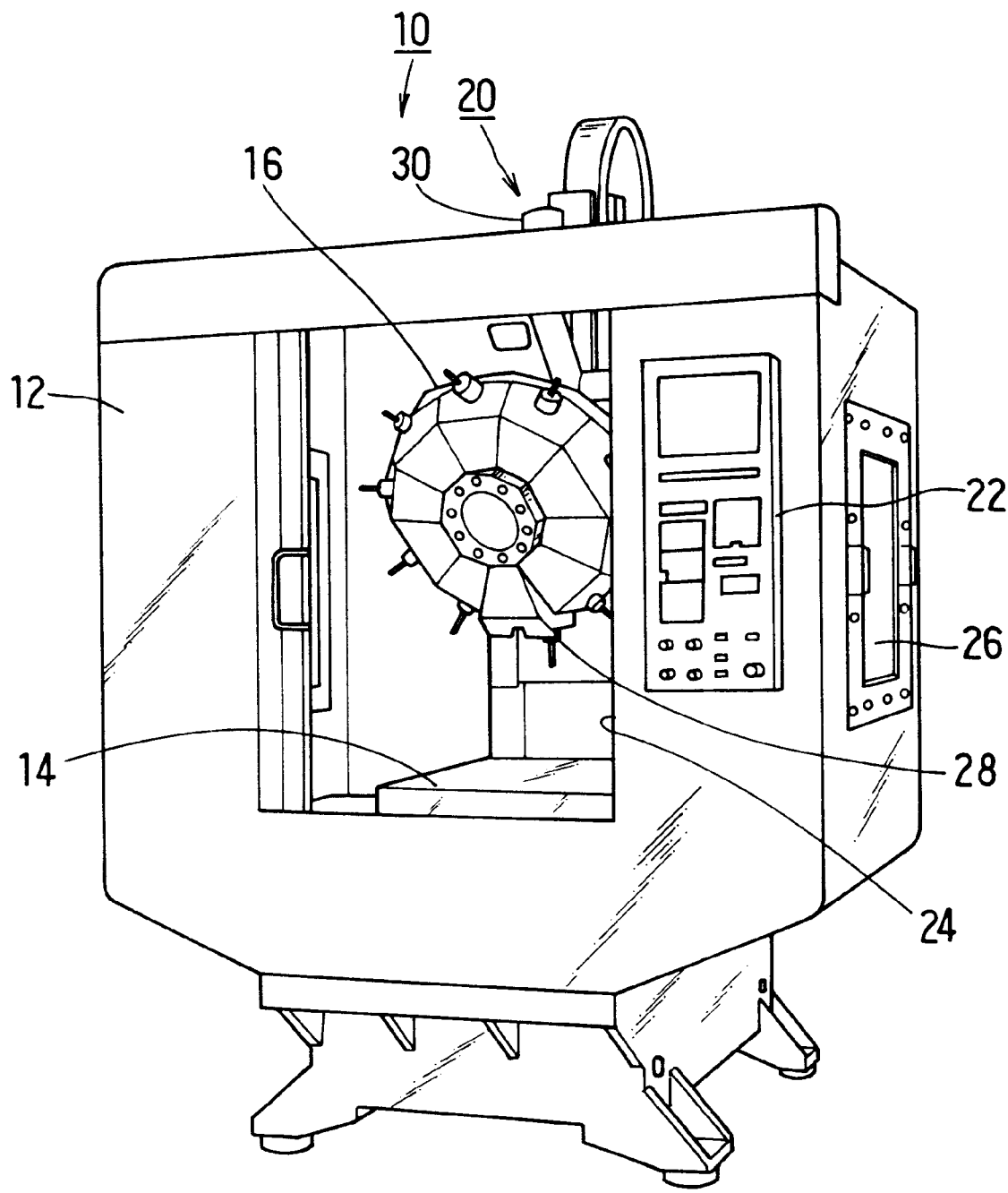
FIG. 18 is a perspective view showing a machine tool to which the embodiments of the invention are applied.
Figure 19:
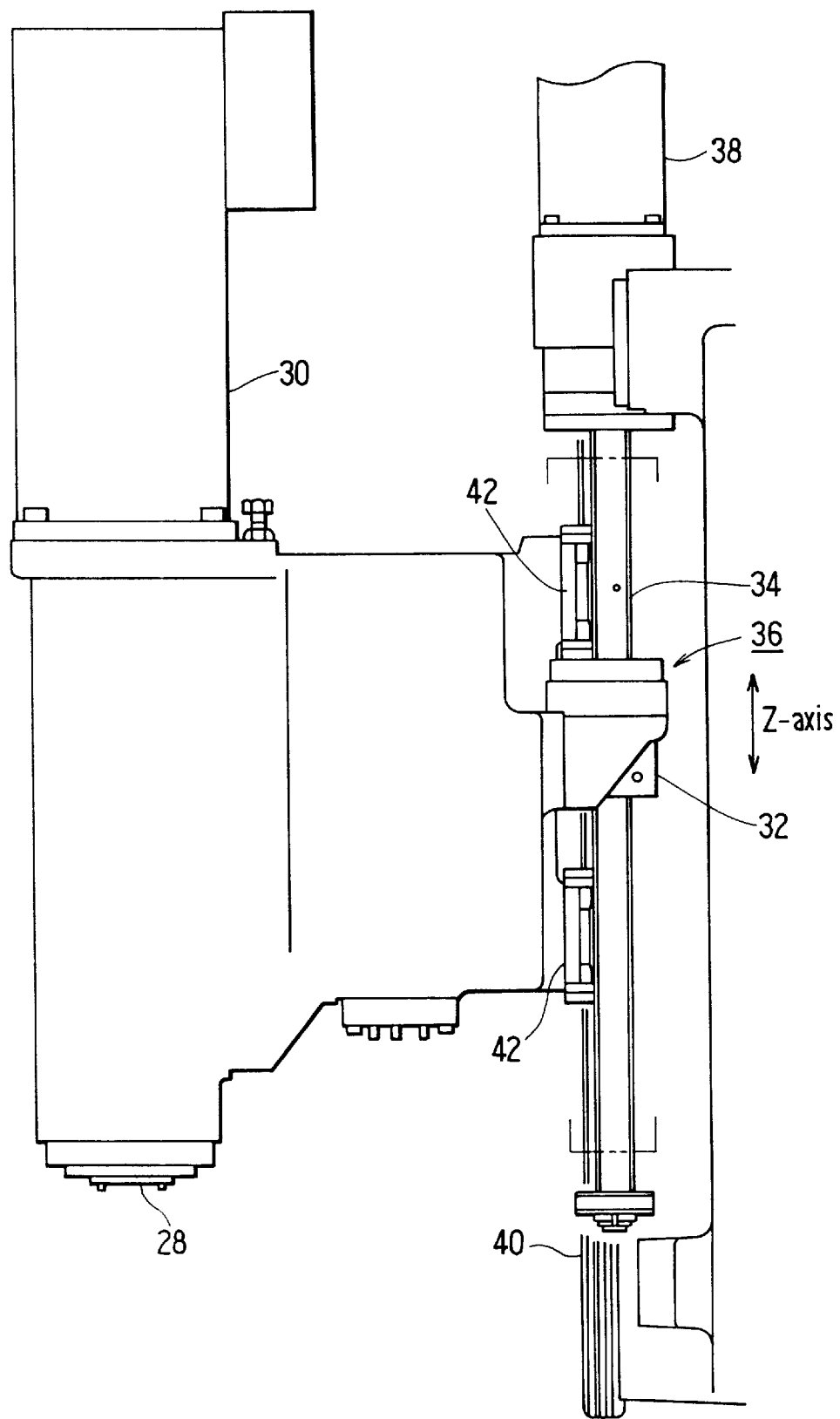
FIG. 19 is a side view showing the machine tool shown in FIG. 18.

Various Embodiments of the present invention is applied to a machine tool which is the same as the machine tool 10 shown in FIGS. 18 and 19. The same or similar reference numerals denote the same or similar parts and steps throughout the embodiments.

(First Embodiment)

In the first embodiment, a control system comprises a main shaft control system 50 for controlling the rotation of the main shaft 28, a Z-axis control system 60 for controlling the position of the Z-axis position of the main shaft 28, a microcomputer 70 which operates as a machine tool thermal change amount computation apparatus. The system further comprises a control panel 22, an X-axis control system (not shown) for controlling the X-axis position of the table 14, a Y-axis control system (not shown) for controlling the Y-axis position of the control system and the like.

The main shaft control system 50 comprises a main shaft motor 30, a main shaft servo amplifier 52 for supplying an electric power to the main shaft motor 30 and a shaft control circuit 54 for controlling the manner in which the main shaft servo amplifier 52 supplies an electric power to the main shaft motor 30. The shaft control circuit 54 controls the operation of the main shaft servo amplifier 52 in accordance with an instruction from the microcomputer 70.

The Z-axis control system 60 comprises a Z-axis motor 38, a Z-axis servo amplifier 62 for supplying an electric power to the Z-axis motor 38 and a shaft control circuit 64 for controlling the manner in which the Z-axis servo amplifier 62 supplies an electric power to the Z-axis motor 38. The shaft control circuit 64 controls the operation of the Z-axis servo amplifier 62 in accordance with an instruction from the microcomputer 70. Also, the X-axis control system and the Y-axis control system, not shown, are arranged substantially similarly to the main shaft control system 50 and the Z-axis control system 60.

The microcomputer 70 comprises a one-chip type central processing unit (CPU) 72 having a read-only memory (ROM) for storing a control program, an input/output port (I/O port) or the like, a random-access memory (RAM) 74, a clock 76 or the like as known well in the art. This microcomputer 70 (CPU 72) controls the main shaft control system 50, the Z-axis control system 60 or the like in accordance with the control program thereby to effect a predetermined machining operation on a workpiece. Also, the microcomputer 70 is connected to the control panel 22. Thus, the microcomputer 70 receives input signals from the control panel 22, controls the display of an image or the display of characters on a liquid crystal display (LCD) panel of the control panel 22 and the blinking of a light emitting diode (LED).

Figures 1, 2:
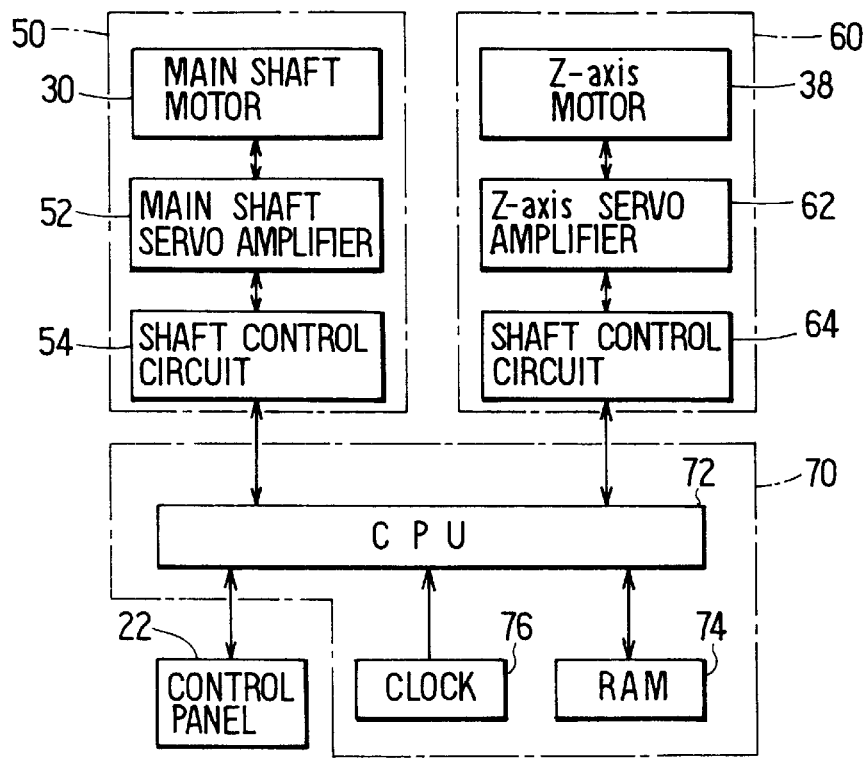
FIG. 1 is a block diagram showing a machine tool control system according to a first embodiment of the present invention.
FIG. 2 is a table showing a pitch error correction of the machine tool.

In this embodiment, a pitch error correction data shown in FIG. 2 is stored in the RAM 74. This pitch error correction data is stored as a data table for correcting a driving error of a ball thread mechanism 36, for example.

The ball thread mechanism 36 for the Z-axis movement cannot avoid an error between a rotation amount of the ball thread 34 and a movement amount (i.e., Z-axis direction movement amount of the main shaft 28) of the nut portion 32 due to a manufacturing tolerance or the like, and hence such error has to be corrected. Therefore, there are set a proper number of correction points, e.g., 25 correction points if a length of ball thread 34 is 500 mm and a correction is executed at every 20 mm. An error between a computed value and an actual value of a movement amount obtained when the ball thread 34 is rotated is measured at every correction point. A rotation amount (pitch) of the ball thread 34 corresponding to that error is stored in the pitch error correction table. The ball thread 34 is rotated in the positive direction or in the opposite direction by the amount of the pitch at every correction point, thereby making the Z-axis position of the main shaft 28 become accurate. This relationship applies to the X-axis and the Y-axis as well.

The clock 76 measures time to calculate a date and time and supplies such data to the CPU 72. The CPU 72 has a counter capable of incrementing a count value at every constant period (e.g., at every 1/10 second). Such a counter is used to measure an elapsed time such as a time period from the start to the end of a certain machining work, for example.

When the machine tool 10 is driven, a thermal change occurs in the Z-axis direction, for example, due to an expansion of the ball thread 34 or the like. Accordingly, the CPU 72 executes a thermal change amount computation processing shown in FIG. 3 in order to execute a work program while correcting the thermal change. After being powered, the CPU 72 executes this thermal change amount computation processing at a predetermined timing as an interrupt processing thereby to compute a thermal change amount generated when a work program is executed.

Figure 3:
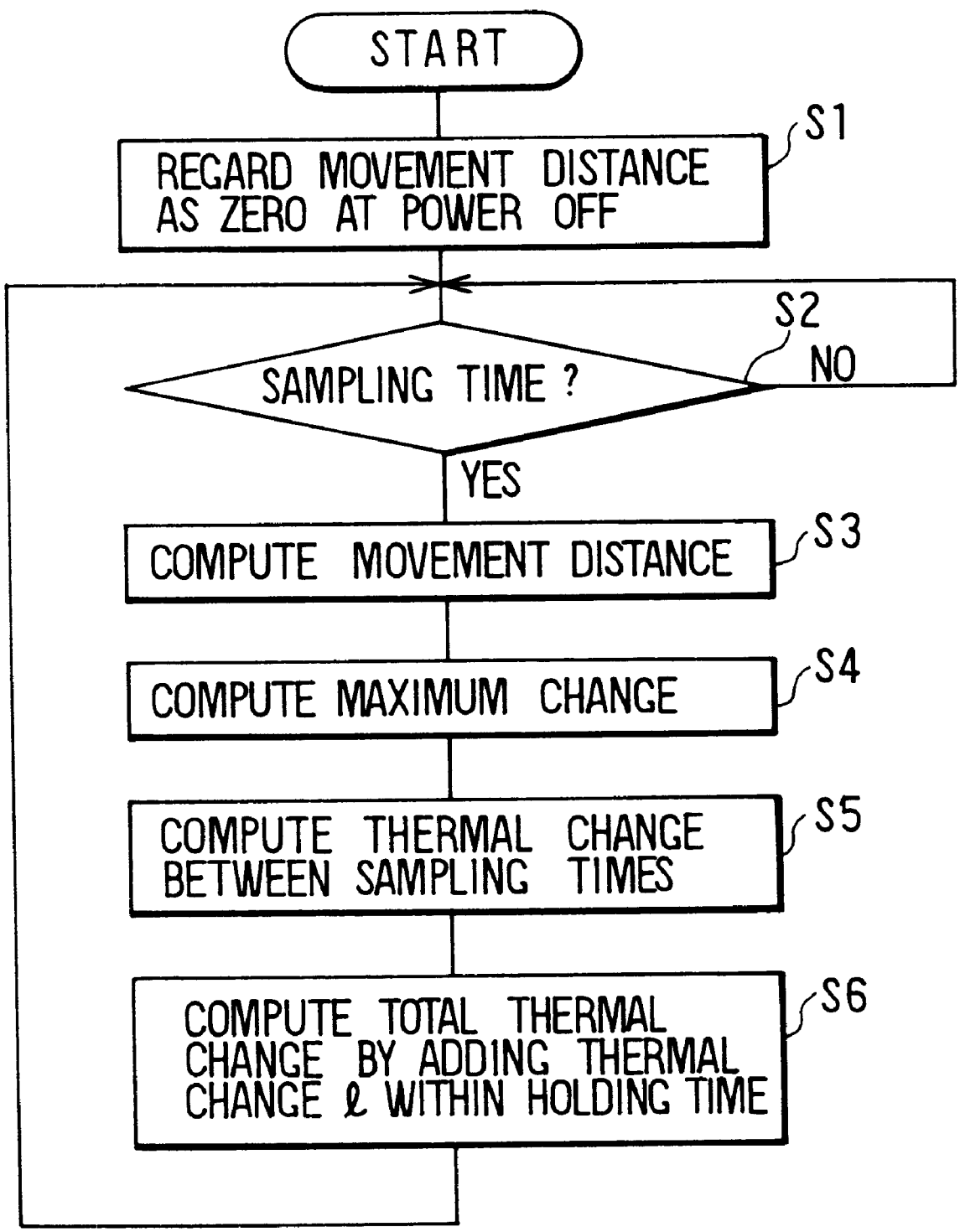
FIG. 3 is a flow chart showing a thermal change computation processing executed by a CPU of the machine tool.

As shown in FIG. 3, when the processing starts, the CPU 72 regards a movement distance obtained when a power supply is at OFF as zero at step S1. When the thermal change amount was computed before and its influence remains, the thermal change amount of the machine tool 10 has to be computed in consideration of such influence. Also, it is frequently observed that such thermal change amount still remains even after a power supply of the machine tool 10 was temporarily turned to OFF state such as an intermission in a factory or the like. Therefore, at step S1, the Z-axis direction movement distance of the main shaft 28 obtained when the power switch is turned to the OFF state is set to zero.

In the next step S2, it is determined based on the output from the clock 76 whether or not a time reaches a predetermined sampling time (a short interval). If a time does not yet reach the predetermined sampling time (S2:NO), then the CPU 72 is placed in the standby state. If a time reaches the sampling time (S2:YES), then control goes to step S3. In step S3, a driving state of the machine tool 10 is detected from the executed state of the work program or the like, and the Z-axis direction movement distance of the main shaft 28 obtained during the sampling time is computed based on the detected driving state of the machine tool 10. Thereafter, control goes to step S4, whereat a maximum change amount L as a saturated thermal change amount is computed as follows.

Figure 4:
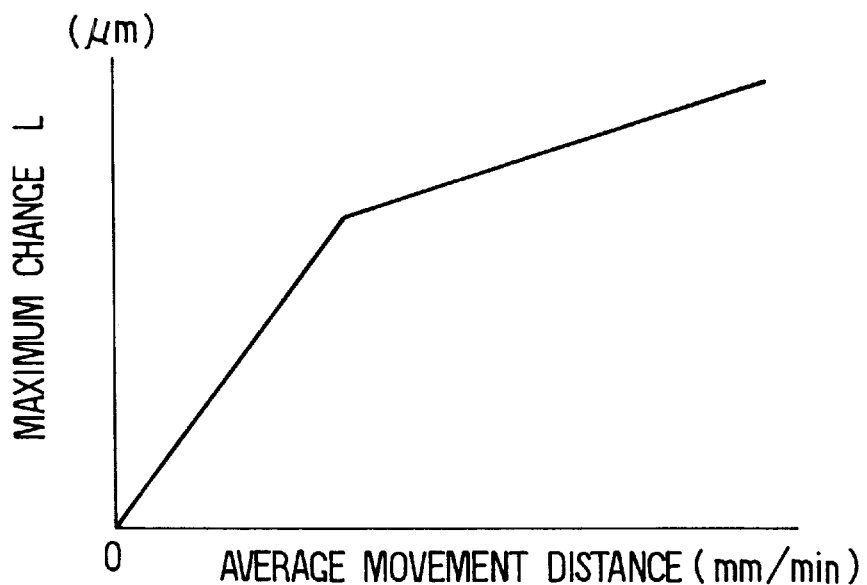
FIG. 4 is a graph showing a map used to compute a maximum change amount.

When a temperature rises as the machine tool 10 is driven continuously, a heat generation amount and a heat radiation amount are placed in the equilibrium state soon. A thermal change amount obtained at that time is the maximum change amount L. When the machine tool 10 is continuously driven under a constant operating state, the maximum change amount L has a corresponding relationship relative to an average movement distance per unit time of the main shaft 28. As shown in FIG. 4, the maximum change amount L increases, as the average movement distance increases. Moreover, this corresponding relationship is represented by a characteristics line the inclination of which becomes gentle when the average movement distance becomes greater than a predetermined distance. This characteristics results from the fact that, when the main shaft 28 is moved at a high speed, the heat radiation amount increases owing to an air-cooling effect to suppress a thermal change. At step S4, the movement distance computed at step S3 is converted into an average movement distance per unit time (mm/min), and a corresponding maximum change amount L is computed with reference to the map shown in FIG. 4. The map shown in FIG. 4 may be stored in the CPU 72 in the form of an equation or a data table.

Figure 5:
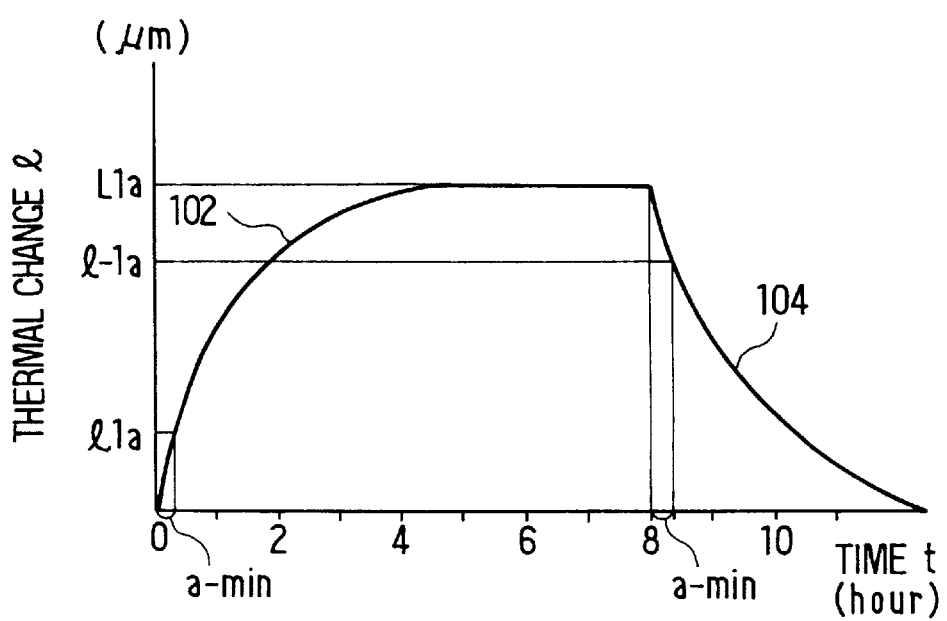
FIG. 5 is a graph showing a time-dependent change of a thermal change amount corresponding to the maximum change amount.

In the next step S5, a thermal change amount 1 between the succeeding sampling times is computed as follows. As shown in FIG. 5, by way of example, when a maximum change amount is $L_{1a}$, the thermal change amount 1 obtained during the machine tool 10 is driven draws a gradually increasing asymptotic curve 102 relative to a straight line $1=L_{1a}$. When the machine tool 10 is stopped after the thermal change amount 1 reached the maximum change amount $L_{1a}$ (timing point of t=8 hours in FIG. 5), the thermal change amount 1 draws a gradually decreasing asymptotic curve 104 relative to a straight line 1=0. Here, the asymptotic curve 102 is expressed as:

$$1=L_{1a} \cdot \{1-\exp(-\gamma t)\} \quad (1)$$

The asymptotic curve 104 is expressed as:

$$1=L_{1a} \cdot \exp(-\gamma t) \quad (2)$$

However, γ is a constant inherent in the machine tool 10, and units of t and 1 are hour and μm, respectively. Accordingly, from the equations (1) and (2), a thermal change amount $1_{1a}$ obtained after a-minutes since the machine tool 10 was started operating is expressed as:

$$1_{1a}=L_{1a} \cdot \{1-\exp(-\gamma \cdot a/60)\}$$

Further, the thermal change amount $1_{1a}$ obtained after a-minutes since the machine tool 10 was stopped is expressed as:

$$1_{-1a}=L_{1a} \cdot \exp(-\gamma \cdot a/60)$$

At step S5, the thermal change amount 1 between the sampling times is computed by mainly using the above equation (1). Further, in the next step S6, the thermal change amount 1 within a holding time, which will be described below, is added and a total thermal change amount is computed as follows. Then, control goes back to step S2, whereat the CPU 72 is placed in the standby mode until the next sampling time.

Figure 6A:
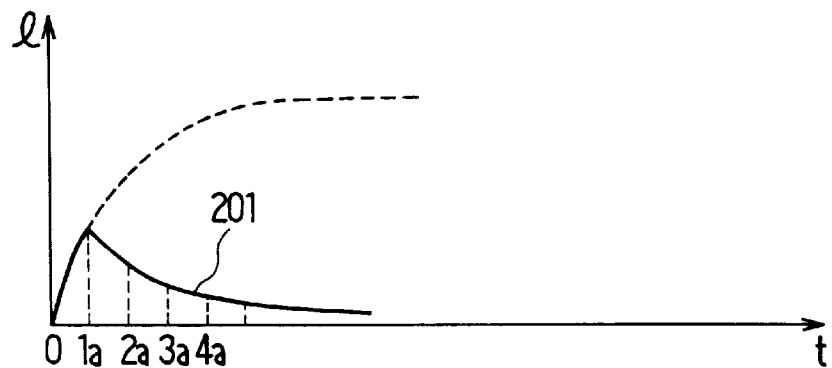
FIGS. 6A, 6B, and 6C are graphs showing the manner in which a total thermal change amount is computed from the thermal change amount.

According to this embodiment, assuming that, when the thermal change amount 1 is computed based on the movement distance between the sampling times (S3 to S5), the thermal change amount 1 decreases in accordance with the equation (2) later. Specifically, as shown by a curve 201 in FIG. 6A, by way of example, a value $1_{1a-1}$ of the thermal change amount 1 computed at a time 1a based on the movement distance from a time 0 to the time 1a is represented as:

$$1_{1a-1}=L_{1a} \cdot \{1-\exp(-\gamma \cdot a/60)\}$$

where $L_{1a}$ is the maximum change amount computed by a sampling time of the time 1a. Then, a value $1_{1a-2}$ of the thermal change amount $1_{1a}$ at a time 2a is obtained by the equation (2) as follows:

$$1_{1a-2}=1_{1a-1} \cdot \exp(-\gamma \cdot a/60)$$

Similarly, values $1_{1a-3}$, $1_{1a-4}$ of the thermal change amount $1_{1a}$ at a time 3a and a time 4a are expressed as:

$$1_{1a-3} = 1_{1a-1} \cdot \exp(-\gamma \cdot 2a/60)$$

$$1_{1a-4} = 1_{1a-1} \cdot \exp(-\gamma \cdot 3a/60)$$

Figure 6B:
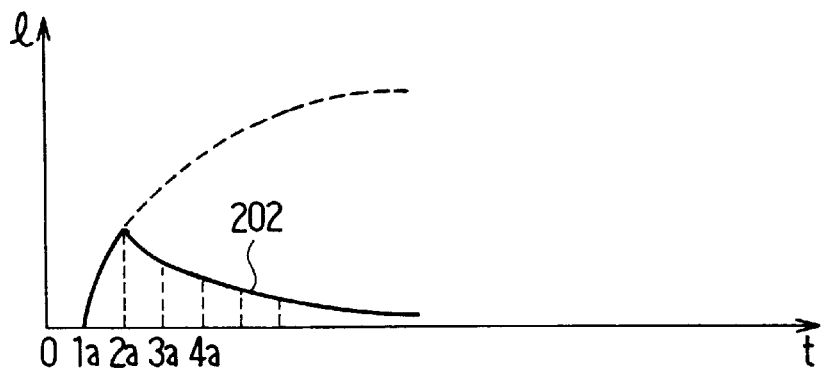

Similarly, it is assumed that the maximum change amount L is computed based on the movement distance from the time 1a to the time 2a, then a corresponding thermal change amount 1 is changed as shown by a curve 202 in FIG. 6B, and values $1_{2a-1}$, $1_{2a-2}$, $1_{2a-3}$ are respectively represented as:

$$1_{2a-1} = L_{2a} \cdot \{1 - \exp(-\gamma \cdot a/60)\}$$

$$1_{2a-2} = 1_{2a-1} \cdot \exp(-\gamma \cdot a/60)$$

$$1_{2a-3} = 1_{2a-1} \cdot \exp(-\gamma \cdot 2a/60)$$

Figure 6C:
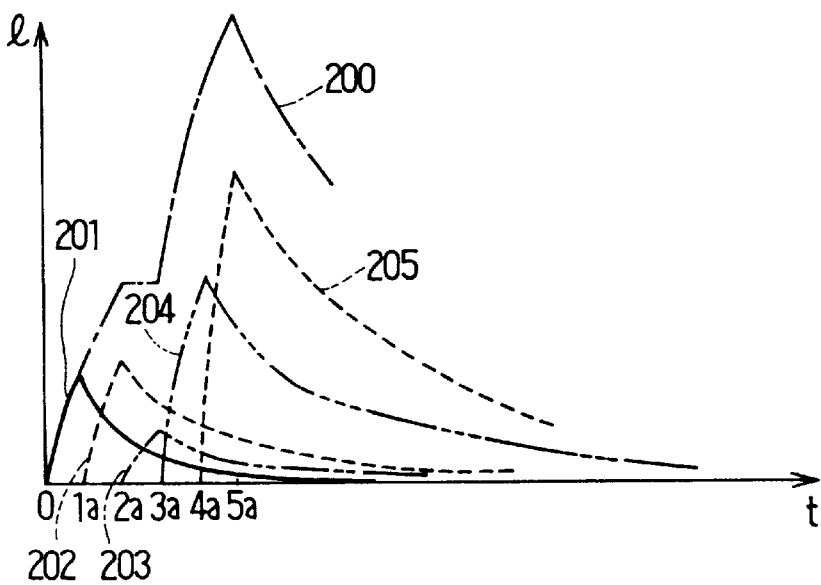

In step S6, the total thermal change amount is computed by adding the values obtained at the time points of the thus computed thermal change amounts $1_{1a}$, $1_{2a}$ . . . For example, assuming that the thermal change amounts 1 shown by curves 201, 202, 203, 204, 205 in FIG. 6C are computed based on the movement distances between the sampling times of the times 1a, 2a, 3a, 4a, 5a, . . . , then the total thermal change amount computed at step S6 changes as shown by a curve 200 in FIG. 6C.

Further, since the thermal change amount 1 computed at each time decreases as the time elapses, it becomes possible to neglect an influence exerted upon the total thermal change amount by the thermal change amount 1 obtained after a predetermined time (e.g., 120 minutes) elapsed since it has been computed at step S5. Accordingly, the CPU 72 memorizes the above predetermined time in the ROM as the holding time, and calculates the total thermal change amount by adding only the thermal change amounts 1 computed within the holding time. To this end, the number of the thermal change amounts 1 that should be added at step S6 is suppressed to be a natural number not more than 120/a+1, and hence a computation processing load may be reduced. Therefore, a software (program) concerning such processing may be simplified, and a processing speed can be increased.

Also, the CPU 72 memorizes the thermal change amounts 1 computed at respective times in the table of the RAM 74 in association with the times at which the thermal change amounts are computed, and is able to hold the memorized contents by a back-up power supply during the power switch is turned OFF. Thus, when the power switch is turned ON again after it was temporarily turned OFF, the movement distance obtained during the power switch is turned OFF is regarded as zero (accordingly the thermal change amount 1 also is zero) at step S1. Then, control goes to step S6, whereat the total thermal change amount can be computed by adding the influences of the thermal change amounts, of the thermal change amount 1 computed during the power switch is turned ON before, within the holding time after having been computed.

As described above, the microcomputer 70 in this embodiment computes the maximum change amount L based on the movement distance between the sampling times, and computes the thermal change amounts 1 of the machine tool 10 based on the maximum change amount L. As a consequence, regardless of whether or not the work program is changed, the thermal change amount 1 may be computed accurately with ease. Further, the data map 4 which is referred to when the maximum change amount L is computed presents a broken line shape the inclination of which becomes gentle in the area in which the movement distance (i.e., movement speed) is large. Therefore, it is possible to compute the maximum change amount L accurately considering the influence of the air-cooling effect. Accordingly, the microcomputer 70 according to this embodiment may generally cope with the change of the work program and is able to compute the total thermal change amount accurately.

Further, the microcomputer 70 computes the movement distance periodically at every sampling time, computes the maximum change amount L and the thermal change amount 1 based on the movement distance computed at that time point, and adds the influence of the thermal change amount 1, which was computed in the past, to the computed thermal change amount 1. Therefore, it is possible to accurately compute the total thermal change amount in response to the driving state of the machine tool 10 at each time. Accordingly, even though the work program includes step for driving the machine tool 10 at a high speed and step for driving the machine tool 10 at a low speed, the total thermal change amount at each time may be computed accurately.

In the first embodiment, the main shaft 28 operates as a machining mechanism, the ball thread mechanism 36 and the Z-axis motor operate as a drive mechanism, the ROM within the CPU 72 operate as a holding time memory, the CPU 72 operates as a drive state detecting unit, a change amount computing unit and a change amount adding unit. Of the processing in the CPU 72, step S3 operates as the drive state detecting unit, steps S4 and S5 operate as the change amount computing unit, and step S6 operates as the change amount adding unit, respectively.

(Second Embodiment)

A second embodiment shown in FIG. 7 differs from the first embodiment in the following points.

That is, the microcomputer 70 includes an interface (I/F) 78 in addition to the arrangement in the first embodiment, and is connected through this interface 78 to a personal computer 80. The personal computer 80 include a one-chip CPU 82 including a ROM for storing a control program and input/output ports, a RAM 84, a clock 86 and an interface (I/F) 88 connected to the microcomputer 70. A keyboard 91 and a CRT 92 also are connected to the personal computer 80. In this control system, the microcomputer 70 controls the machine tool 10 based on the work program, and computes and transmits data such as a movement distance of the main shaft 28 to the personal computer 80. The personal computer 80 executes a total thermal change amount computation processing and transmits the total thermal change amount thus computed to the microcomputer 70. Then, the microcomputer 70 executes the work program based on the total thermal change amount thus computed while executing the correction.

Figure 8:
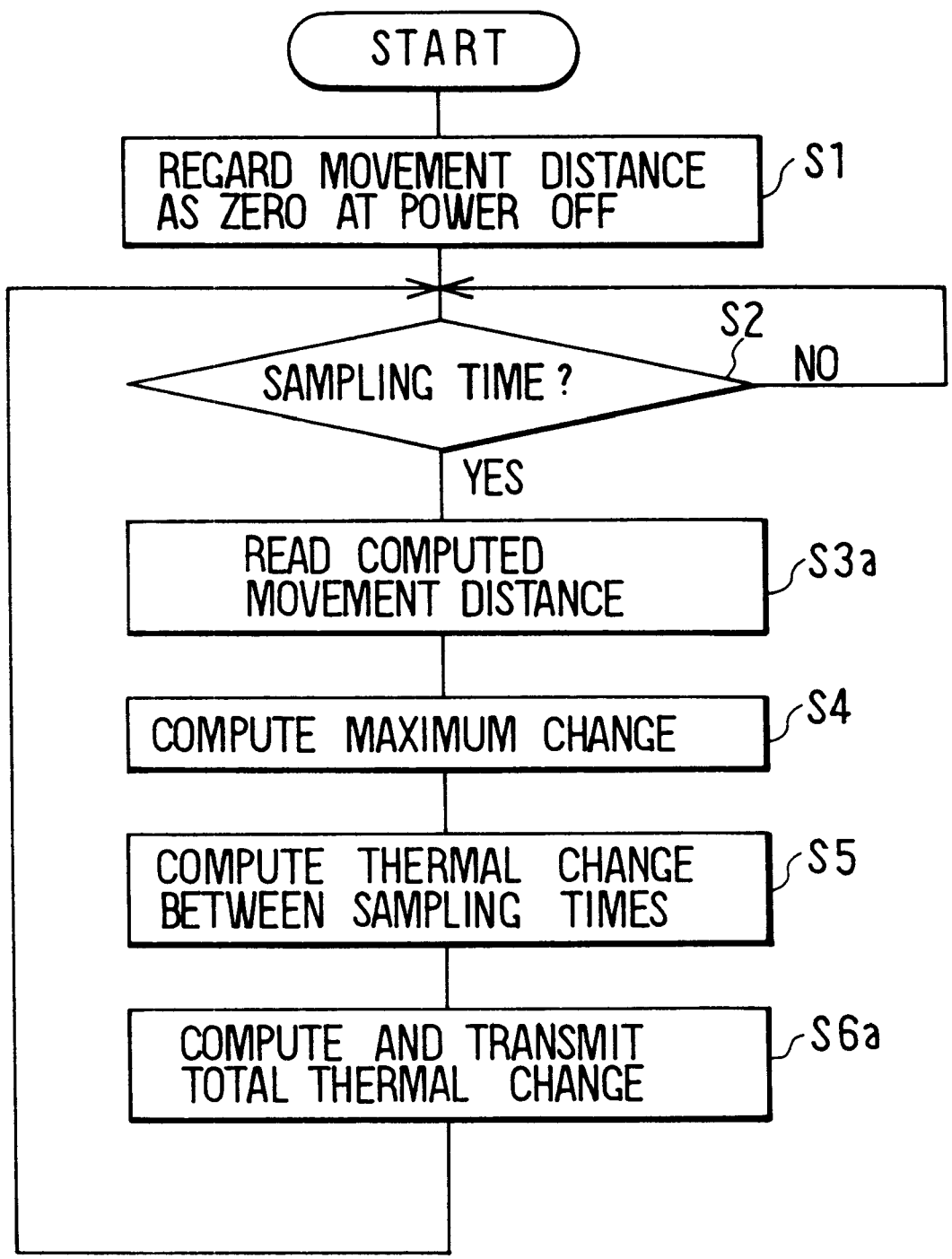
FIG. 8 is a flow chart showing a thermal change amount computation processing executed by a personal computer connected to the machine tool.

The personal computer 80 (CPU 82) executes the total thermal change amount computation processing as shown in FIG. 8. The CPU 82 monitors the power supply state of the machine tool 10. When the power switch thereof is turned ON, the CPU 82 executes this processing shown in FIG. 8 repeatedly at a predetermined timing. This thermal change amount computation processing is substantially the same as the thermal change amount computation processing shown in FIG. 3 except for steps S3a and S6a.

In step S3a, the movement distance is not computed by the CPU 82 itself but the movement distance computed by the microcomputer 70 is read. Also, in step S6a, after the total thermal change amount is computed similarly to step S6, the resulting total thermal change amount is transmitted to the microcomputer 70.

This embodiment may achieve substantially the same operation and advantage as the first embodiment. In this embodiment, however, the CPU 82 memorizes the thermal change amount 1 computed at each time in the table of the RAM 84 in association with the time at which the thermal change amount is computed. This memorized content need not always be kept safe by the backup, because so long as the power switch of the personal computer 80 is held ON even after the power switch of the machine tool 10 is turned OFF, the memorized contents will not be lost. Moreover, in this embodiment, if the machine tool 10 that is connected through the interface 88 is changed, one personal computer 80 is able to compute total thermal change amounts of a plurality of machine tools 10.

(Modification to First and Second Embodiments)

The above embodiments may be modified as follows.

For example, while the thermal change amount of the Z-axis direction of the machine tool 10 is computed based on the movement distance of the Z-axis of the main shaft 28, a thermal change occurs in the main shaft 28 itself as the main shaft 28 rotates. Accordingly, the rotation amount of the main shaft motor 30 may be computed as the movement distance and the Z-axis direction thermal change amount may be computed from the movement distance. Moreover, the Z-axis direction thermal change amount of the whole of the machine tool 10 may be computed by adding the thermal change amount computed from the rotation amount of the main shaft 28 to the total thermal change amount computed by the processing in FIG. 3 or FIG. 8. In this case, the Z-axis direction thermal change amount may be computed more accurately. Further, the present invention may be applied to a mechanism in which a workpiece is moved.

Figure 9A:
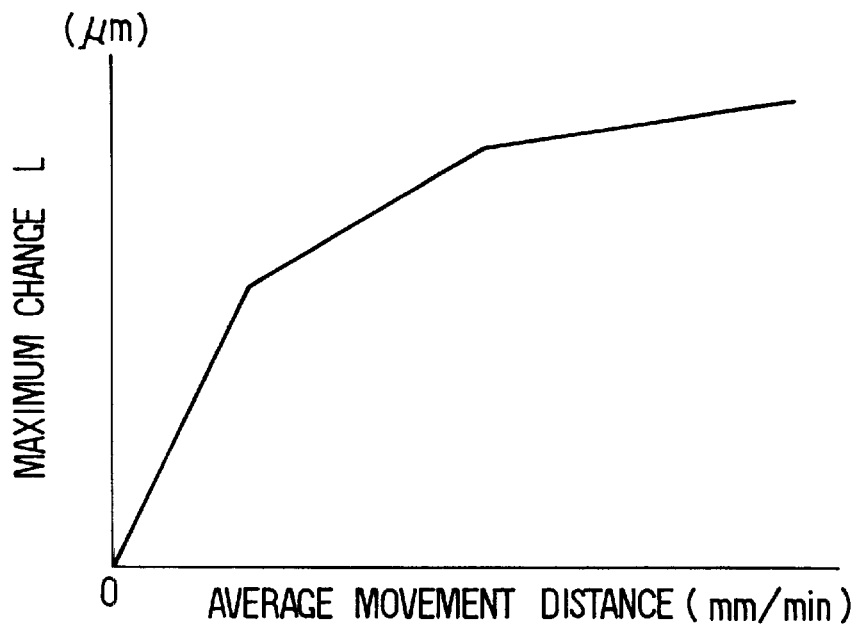
FIGS. 9A and 9B are graphs showing other maps used to calculate a maximum change amount.
Figure 9B:
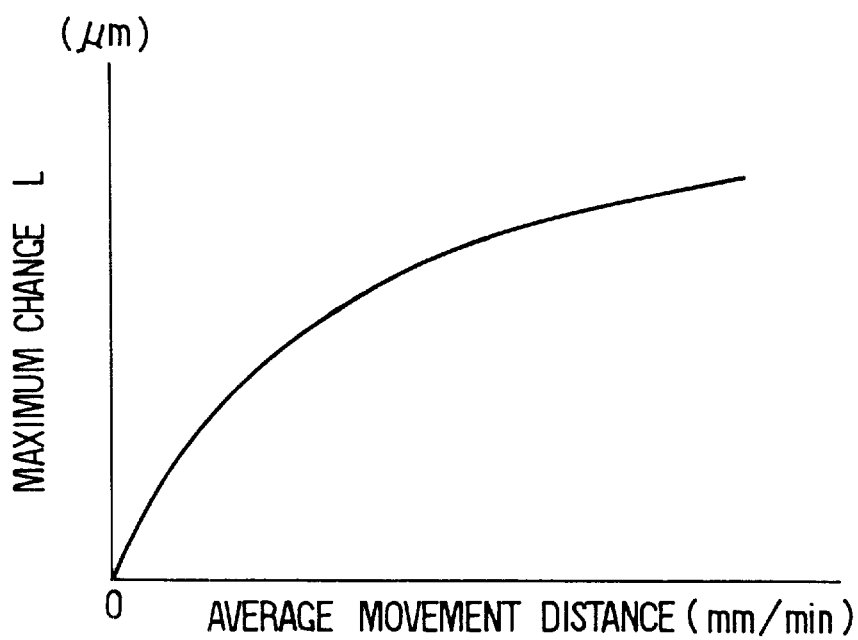

The data map for computing the maximum change amount L is not limited to that shown in FIG. 4. Such a map may be formed by a polygonal line having more than three kinds inclinations shown in FIG. 9A or such a map may be formed by a curve shown in FIG. 9B. Further, if necessary, a map in which an inclination becomes steep at the portion in which the average movement distance is large may be used, and a map may be composed of curves of a number of stages. Furthermore, these maps may be provided by equations and data tables.

Figure 10:
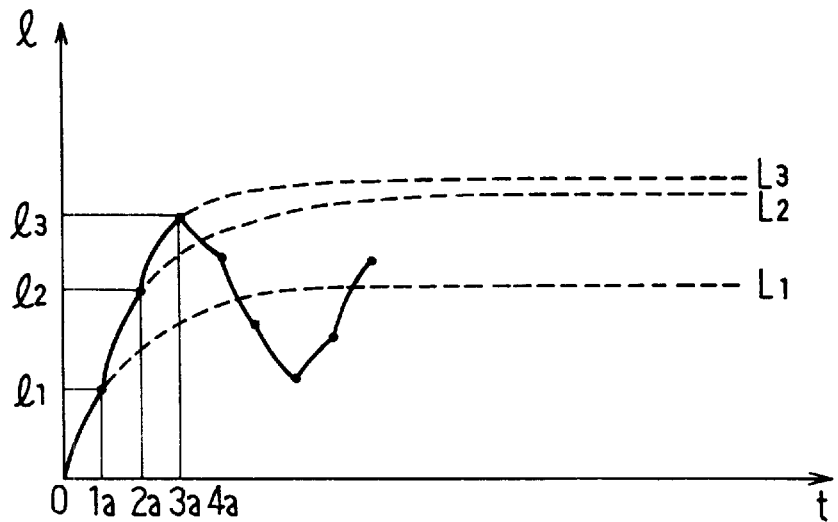
FIG. 10 is a graph showing other processing for computing a total thermal change amount from a thermal change amount.

Moreover, a variety of forms for adding the influence of the thermal change amount 1 that has been computed previously may be taken into account, and a form shown in FIG. 10 may be adopted. In FIG. 10, using a thermal change $1_1$ computed at a time 1a as a starting point, there is drawn a curve for computing a thermal change amount $1_2$ at a time 2a. Then, using the thus computed thermal change amount $1_2$ as a starting point, there is drawn a curve for computing a thermal change amount $1_3$ at a time 3a.

Here, maximum change amounts computed at the times 1a, 2a, 3a are changed as $L_1$, $L_2$, $L_3$. Although the thermal change amount $1_1$ may be computed similarly to the above method, thermal change amounts $1_2$ at times following the time 2a may be computed as follows. When the thermal change amount $1_2$ at a time 2a, for example, is computed, a value t of $t_{11}$ where $1=1_1$ is satisfied is obtained from the above equation (1):

$$1_2 = L_2 \cdot \{1 - \exp(-\gamma t)\}$$

Then, the time 2a is extrapolated by a time of a-minutes later as:

$$1_2 = L_2 \cdot [1 - \exp\{-\gamma(t_{11} + a/60)\}]$$

According to the aforementioned computation method, even if erroneous data is inputted temporarily, an influence of such an erroneous inputted data may be removed after at least 120 minutes.

Figure 11:
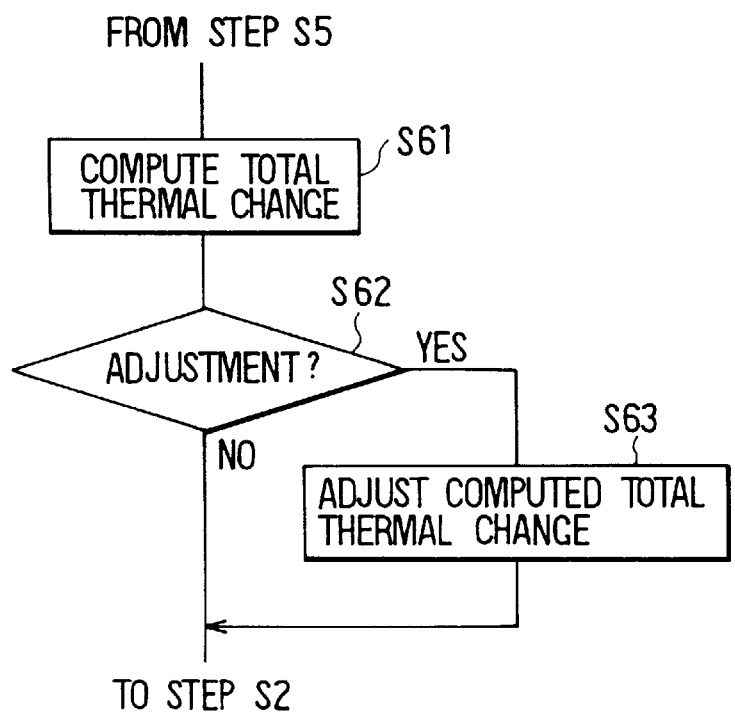
FIG. 11 is a flow chart showing a modification to a thermal change amount computation processing.

Further, a variety of conditions affect the thermal change amount of the machine tool 10 in addition to the movement distance of the main shaft 28 and the drive time. For example, in the morning or the like in which a temperature is relatively low, a rise of temperature in the machine tool 10 becomes slow and an error between the computed total thermal change amount and the actual thermal change amount becomes such one that cannot be substantially neglected. Therefore, step S6 in FIG. 3, for example, may be changed as shown in FIG. 11 such that a variety of adjustments may be executed.

That is, at step S61, a total thermal change amount is computed similarly to step S6. In the next step S62, it is determined by the CPU 72 whether or not the total thermal change amount computed at step S61 should be adjusted. This decision is made by determining whether or not the following conditions are established; (1) an adjustment value is inputted through the control panel 22; (2) there is an adjustment value set in response to the time; and (3) an adjustment value should be used in response to an environmental temperature. If the condition is established, then the adjustment is required (S62:YES), and control goes to step S63, whereat the adjustment value is added to or subtracted from the total thermal change amount. If on the other hand the adjustment is not required (S62:NO), then the total thermal change amount that was computed at step S61 is held as it is, and control goes to step S2 (FIG. 3). That is, step S63 operates as a change amount adjusting unit.

In this case, if the adjustment value is determined in response to time, then the error between the computed total thermal change amount and the actual thermal change amount may automatically be removed in response to a time period of a day (morning, noon, night, etc.). Accordingly, it is possible to constantly compute an accurate total thermal change amount regardless of time. Further, if the adjustment value is determined in response to the environmental temperature of the machine tool 10, then the error between the computed total thermal change amount and the actual thermal change amount may automatically be removed in response to an environmental temperature, i.e., temperature at a location where the machine tool 10 is installed. Accordingly, it is possible to constantly compute a total thermal change amount more accurately regardless of the environmental temperature. Step S5 in FIG. 3, step S5 or S6a in FIG. 8 may be changed in the same manner.

Figure 12:
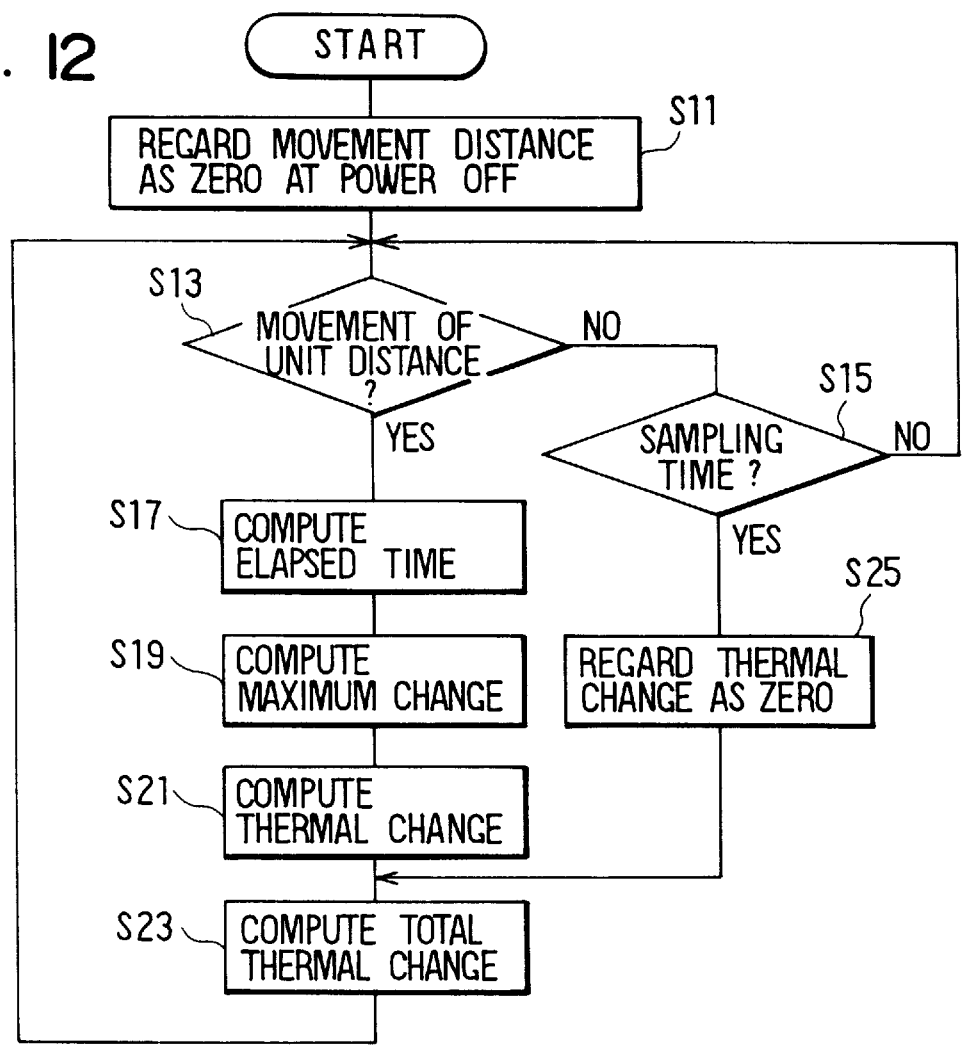
FIG. 12 is a flow chart showing a further modification to a thermal change amount computation processing.

Furthermore, while the thermal change amount is computed at every predetermined time (at every sampling time), the thermal change amount may be computed at every predetermined drive amount of the machine tool 10 as shown in FIG. 12.

Figure 13:
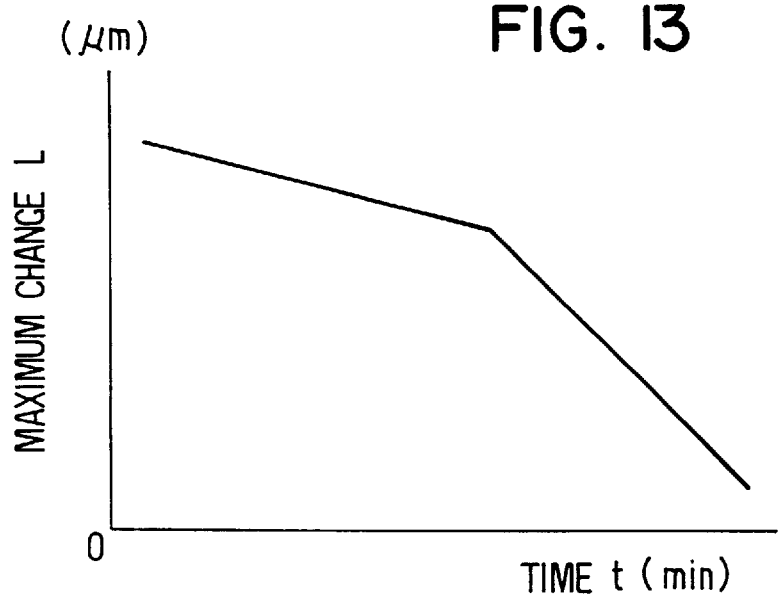
FIG. 13 is a graph showing a map used to compute a maximum change amount in the processing.

When the apparatus is powered and the CPU 72 starts the processing, initially, at step S11, a movement distance obtained during the power switch is OFF is regarded as zero similarly to step S1. In the next step S13, the driving state of the machine tool 10 is detected, and it is determined on the basis of the detected result whether or not the main shaft 28 is moved by a unit distance. If the main shaft 28 is not moved by the unit distance (S13:NO), then control goes to the next step S15, whereat it is determined whether or not a elapsed time reaches a sampling time. If the time does not yet reach the sampling time (S15:NO), then control goes back to step S13. The sampling time in the present processing is set to be sufficiently long, and normally, the main shaft 28 is moved by a predetermined distance (S13:YES) before the sampling time, and control goes to step S17. In step S17, a time in which the loop processing formed at steps S13 and S15 is continued, i.e., an elapsed time required by the main shaft 28 to move the unit distance is computed, and the maximum change amount L corresponding to such elapsed time is computed with reference to a data map shown in FIG. 13. Since the elapsed time becomes substantially a reciprocal of the average movement distance, the map in FIG. 13 and the map in FIG. 4 become opposite to each other in inclination.

In the subsequent steps S21, S23, after the thermal change amount 1 is computed, the computed result is added to the thermal change amount thereby to compute the total thermal change amount similarly to steps S5, S6. If the time reaches the sampling time (S15:YES) during the loop processing of steps S13, S15 is continued, then in this case, it is considered that the main shaft 2 is almost stopped. Accordingly, in this case, the thermal change amount 1 obtained during that period is regarded as zero, and the total thermal change amount is computed at step S23.

According to this processing, the total thermal change amount is computed each time the main shaft 28 moves the unit distance. If the movement speed of the main shaft 28 is higher, then the total thermal change amount can be computed more frequently. Accordingly, when the movement speed of the main shaft 28 is changed very frequently, it is possible to compute the total thermal change amount more accurately. Further, when the main shaft 28 is almost stopped, since the total thermal change amount is computed at every sampling time, reliability of computation may be improved more.

Further, as the driving state of the machine tool 10, any other driving states may be detected, and a variety of forms for computing the thermal change amount based on the driving state may be taken into account. For example, there may be considered a form which does not use a concept of saturated thermal change. Also, while the programs for executing the processing of FIGS. 3, 8, 11 or 12 are stored in the ROM of the CPU 72 or 82, these programs may be memorized in a separate recording medium such as a floppy disk and a CD-ROM. In this case, an arbitrary controller such as general-purpose computers may execute the above processing.

(Third Embodiment)

Figure 14:
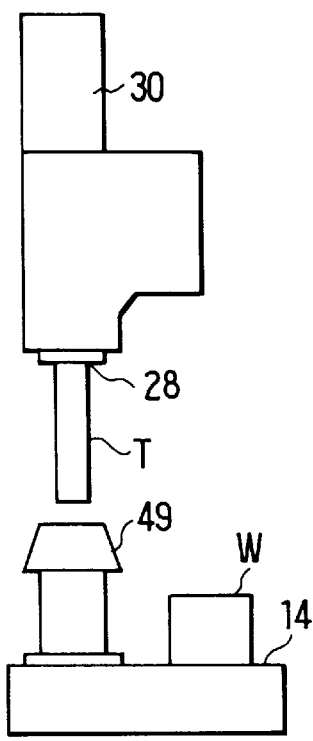
FIG. 14 is a schematic view showing a detector used in a third embodiment of the present invention.
Figure 15:
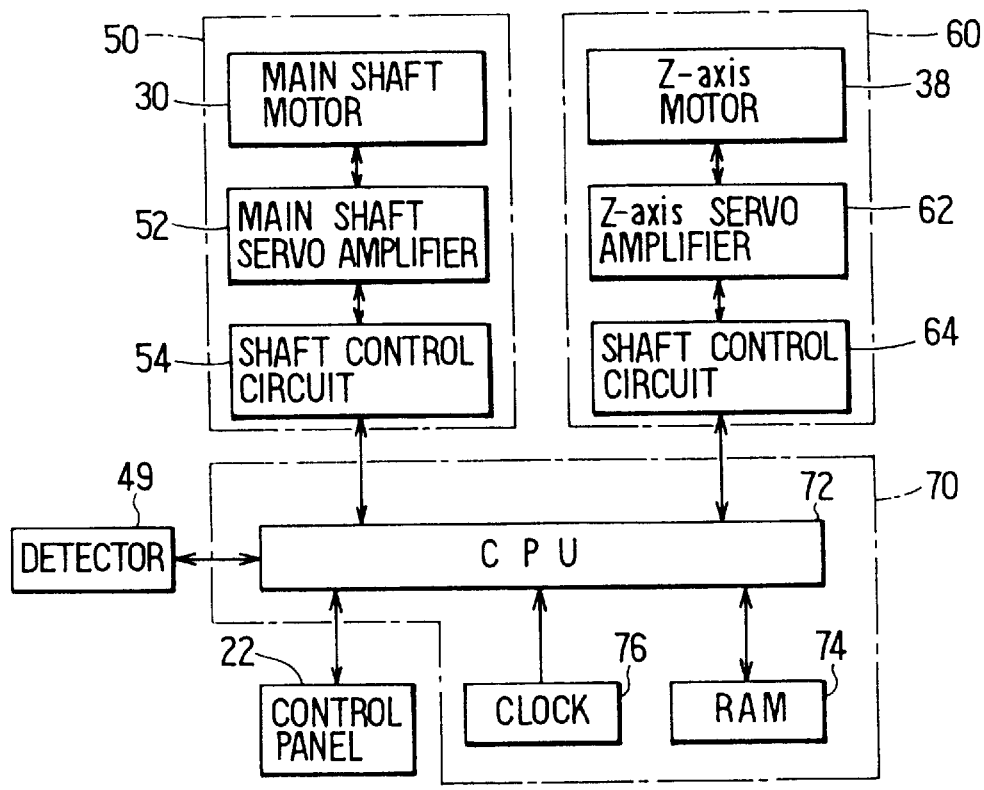
FIG. 15 is a block diagram showing a machine tool control system according to the third embodiment of the present invention.

In a third embodiment shown in FIG. 14, a detector 49 is fixed to a corner of a table 14 to generate a contact signal when a tool T held on a main shaft 28 comes in contact with the detector 49. Also, the detector 49 is able to change the position on the Z-axis so as to become able to execute a measurement at an optimum position in accordance with a workpiece W. When the position is changed, data concerning the position on the Z-axis memorized in a CPU 72 is updated. The detector 49 is connected to a CPU 72 of a microcomputer 70.

Figure 16:
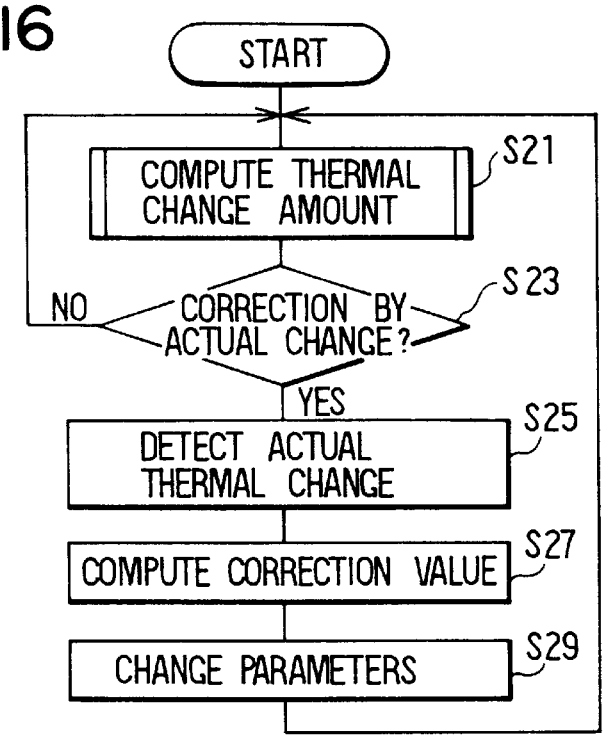
FIG. 16 is a flow chart showing a thermal change computation processing executed by a CPU in the third embodiment.

In this embodiment, the microcomputer 70 (CPU 72) is programmed to execute the thermal change amount computation as shown in FIG. 16. When the CPU 72 starts the processing, initially, the CPU 72 executes at step S21 a thermal change amount computation for computing a thermal change amount based on a driving state of a machine tool 10. More specifically, this thermal change amount may be computed by the same processing in the first embodiment, particularly the processing shown in FIG. 3. Then, control goes to step S23 in which it is determined whether or not the thermal change amount computed by the thermal change amount computation processing at step S21 should be corrected based on an actual value of the thermal change amount. If the computed thermal change amount need not be corrected (S23:NO), then control goes back to step S21, whereat the computation of the thermal change amount is continued. If on the other hand the thermal change amount should be corrected based on the actual value (S23:YES), control goes to steps S25 to S29, whereat the actual value of a thermal change amount is detected and a variety of parameters used in step S21 are changed. Thereafter, control goes back to step S21.

More specifically, if it is determined at step S23 that the thermal change amount should be corrected based on the actual value, then control goes to step S25, whereat the next actual value detection processing is executed. Step S23 determines that the thermal change amount should be corrected based on the actual value when a predetermined time elapses from a time at which the machine tool 10 starts driving and when an operator measures a size error of the workpiece W by some suitable mechanism such as calipers and enters the size error or the like as the actual value of a thermal change amount through the control panel 22. Also, the predetermined time is a driving time required until the thermal change amount that can be sufficiently measured is generated in the machine tool 10, and assumed to be a-minutes (e.g., 30 minutes).

When control goes to step S25 after a-minutes elapsed from the start of the driving, in the actual value detection processing at step S25, the Z-axis control system 60, and the X-axis control system, the Y-axis control system are driven to cause the tool T held on the main shaft 28 to be brought in contact with the detector 49. The CPU 72 receives the contact signal from the detector 49 to compute a driving amount of the Z-axis control system 60 required until the contact is confirmed, and compares the computed driving amount with the assumed driving amount required when the thermal change is not generated in the machine tool 10. Then, the CPU 72 detects the actual value (Z-axis direction) of thermal change amount of the machine tool 10 based on the compared result.

After the actual value is detected, a correction value detection processing at step S27 is executed. In this processing, a correction value relative to the computed value is computed by comparing a total thermal change amount computed at step S21 and the actual value detected at step S25 with each other. In the next step S29, on the basis of the correction value computed at step S27, a variety of parameters (including equations, etc.) used in step S21 are changed and memorized in a predetermined area of the RAM 74 (parameter change processing).

Figure 17A:
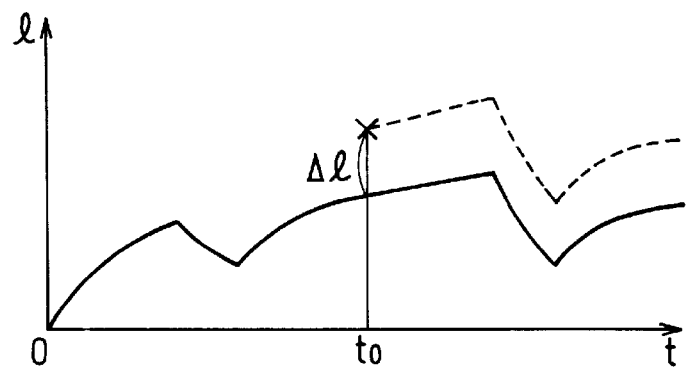
FIGS. 17A and 17B are graphs showing the manner in which a thermal change amount is corrected by an actually detected thermal change amount.
Figure 17B:
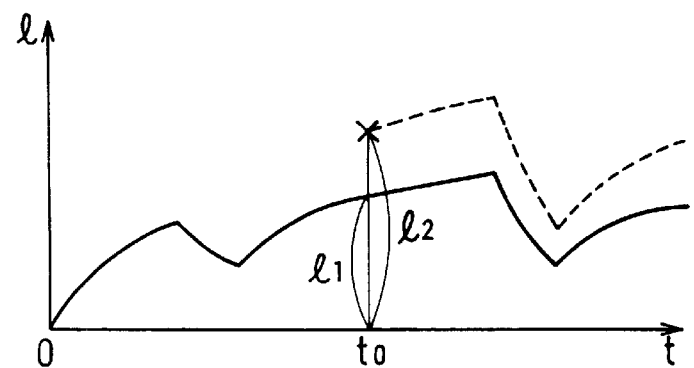

The forms of the processing at steps S27, S29 are such one using a difference between the computed value and the actual value as the correction value and such a form using a ratio therebetween as a correction value. A user may select a desired form by a setting on the control panel 22. In FIGS. 17A and 17B, solid lines show the change of the computed value of the thermal change amount obtained when the thermal change amount is not corrected based on the actual value. Actual values detected at time t0 (a-minutes after the start of the driving of the machine tool 10) are represented by X.

When a difference between the computed value and the actual value is used, as shown in FIG. 17A, a difference $\Delta 1$ which results from subtracting the computed value from the actual value is computed as the correction value (S27), and the difference $\Delta 1$ is added to equations (1), (2) used in steps S27, S29. When steps S25 to S29 are executed and control goes back to step S21, the total thermal change amount computed at step S21 may be corrected as shown by a dotted line in FIG. 17A.

When the ratio between the computed value and the actual value is used, as shown in FIG. 17B, a ratio $l_2/l_1$ between the actual value 12 and the computed value 11 is computed as a correction value (S27), and the ratio 12/11 is multiplied with equations (1), (2) used in step (S29). When steps S25 to S29 are executed and control goes back to step S21, the total thermal change amount computed at step S21 may be corrected as shown by a dotted line in FIG. 17B.

When the difference between the computed value and the actual value is used as the correction value and when the ratio therebetween is used as the correction value, there are the following advantages, and hence the operator may select the desired form by the control panel 22. When the absolute values of the computed value and the actual value are small, the use of the difference becomes advantageous. When the absolute value therebetween is large, the use of the ratio becomes advantageous. Accordingly, when the absolute value of the computed value or the actual value is small, the form in which the difference therebetween is used as the correction value may automatically be selected. On the other hand, when the absolute value is large, the form in which the ratio therebetween is used as the correction value may automatically be selected. Further, other forms using other factors than the difference and the ratio also may be adopted.

When the absolute values of the computed value and the actual value are small, it is unavoidable that a very slight is measurement error is reflected on the value of the ratio therebetween. As a consequence, if the ratio between the computed value and the actual value is computed as the correction value and the resultant value is multiplied with or divided from the total thermal change amount computed at step S21, when a large total thermal change amount is computed at step S21 at timing point other than time t0, there is a possibility that the measurement error will be multiplied with or divided from the computed value and reflected on the resultant computed value. On the other hand, if the difference between the computed value and the actual value is used as the correction value as shown in FIG. 17A, regardless of the absolute value of the total thermal change amount computed at step S21, the correction of the same amount may constantly be executed. Accordingly, in this case, when the absolute values of the computed value and the actual value which are used as the basis to compute the correction value are small, it is possible to compute the accurate thermal change amount.

When the absolute values of the computed value and the actual value are large, the absolute value of the difference therebetween tends to increase. As a result, if the difference between the computed value and the actual value is used as the correction value, when the small total thermal change amount is computed at step S21 at a timing point other than the time t0, it becomes difficult to use a similar correction value. For example, it is frequently observed that the corrected thermal change amount becomes negative. If on the other hand the ratio between the computed value and the actual value is used as the correction value as shown in FIG. 17B, then when the small total thermal change amount is computed at step S21, a correction of a small amount corresponding to such small total thermal change amount may be executed. Accordingly, even when the absolute values of the computed values and the actual value which are used as basis to compute the correction value are large, it is possible to compute an accurate thermal change amount.

If the thermal change amount actual value such as a size error is entered from the control panel 22 and the affirmative answer is outputted at step S23, then the inputted value is read at step S25 (actual value detection processing). Then, in the next steps S27, S29, a similar processing is executed between the read actual value and the computed value.

As described above, the microcomputer 70 according to this embodiment detects the actual value of the thermal change amount of the machine tool 10 (S25), and the total thermal change amount computed at the thermal change amount computation processing (S21) is corrected based on the actual value (S27, S29). Therefore, it is possible to compute the accurate thermal change amount in response to the characteristics of individual machines tools and the environments under which individual machine tools are in use.

In addition, in this embodiment, the actual value of the thermal change amount is not used as it is. The correction value is computed from the actual value, and the total thermal change amount computed at step S21 is corrected by using such correction value. Therefore, once the actual value is detected after the predetermined time (e.g., a-minutes) since the machine tool 10 was started driving, a sufficiently accurate thermal change amount may be computed by using the correction value computed from the actual value. Specifically, when the actual value of the thermal change amount is detected by using the detector 49 like this embodiment, the machining on the workpiece W should be interrupted when the actual value is detected. However, according to this embodiment, such work may be interrupted only once, and hence a machining efficiency may be improved satisfactorily. Also, in this embodiment, since each time the machine tool 10 is energized, the thermal change amount may automatically be corrected based on the actual value, a more accurate thermal change amount may be computed more easily in response to the characteristics of the machine tool 10 and the environment in which the machine tool 10 is in use.

The above correction of the computed thermal change amount based on the actual thermal change amount detected by the detector may be applied also to the second embodiment shown in FIGS. 7 and 8. In this case, the detector 49 may be connected to the microcomputer 70. The third embodiment may be modified further in the same manner as in the modifications of the first and second embodiments.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

I claim:

1. A thermal change amount computation apparatus for use with a machine tool including a machining mechanism for machining a workpiece and a driving mechanism for changing a relative position between the machining mechanism and the workpiece, the apparatus comprising:

a driving state detecting unit for detecting a driving state of the machine tool;

a change amount computing unit for computing a thermal change amount of the machine tool based on the detected driving state detected at every predetermined unit operation of the machine tool; and a change amount adding unit for computing a present thermal change amount of the machine tool by adding an influence of a thermal change amount computed previously to a thermal change amount computed newly when the previously computed thermal change amount is available.

2. The thermal change amount computation apparatus according to claim 1, wherein:

the change amount computing unit computes a saturated thermal change amount as a maximum value of a thermal change of the machine tool based on the detected driving state and computes the thermal change amount based on the saturated thermal change amount and a driving time of the machine tool.

3. The thermal change amount computation apparatus according to claim 1, further comprising:

holding time memory for memorizing a holding time in which the influence of the computed thermal change amount of the machine tool remains, wherein the change amount adding unit neglects the influence of the computed thermal change amount remaining after an elapse of the holding time from a computation of the holding time.

4. The thermal change amount computation apparatus according to claim 1, further comprising:

a change adjusting unit for adjusting the computed thermal change amount by an adjustment value determined in response to a condition which affects the thermal change amount.

5. The thermal change amount computation apparatus according to claim 4, wherein:

the adjustment value is determined variably in response to time.

6. The thermal change amount computation apparatus according to claim 4, wherein:

the adjustment value is determined variably in response to an environmental temperature of the machine tool.

7. The thermal change amount computation apparatus according to claim 1, further comprising:

a movement distance computing unit for computing based on the detected driving state a movement distance of the driving mechanism or the workpiece per unit time; and a saturated thermal change amount computing unit for computing a saturated thermal change amount as a maximum value of a thermal change of the machine tool when a similar driving state is continued based on the computed movement distance with reference to a data map representing a relationship between the movement distance and the saturated thermal change amount, the data map being set such that a rate of increase in the saturated thermal change amount relative to an increase in the movement distance is different depending on the movement distance, wherein the change amount computing unit computes the thermal change amount based on the computed saturated thermal change amount and a driving time of the machine tool.

8. The thermal change amount computation apparatus according to claim 7, wherein:

the rate of increase in the saturated thermal change amount relative to the increase in the movement distance decreases as the movement distance increases.

9. The thermal change computation apparatus according to claim 1, further comprising:

an actual value detecting unit for detecting an actual thermal change amount of the machine tool;

a correction value computing unit for computing a correction value relative to computed thermal change amount by comparing the computed thermal change amount and the actual thermal change amount;

a correction value memory for memorizing the computed correction value; and a change amount correction unit for correcting the computed thermal change amount by using the memorized correction value.

10. The thermal change amount computation apparatus according to claim 9, wherein:

the correction value computing unit computes a ratio between the computed thermal change amount the actual thermal change amount as the correction value; and the change amount correction unit corrects the computed thermal change amount by multiplication or division by the computed ratio.

11. The thermal change amount computation apparatus according to claim 9, wherein:

the correction value computing unit computes a difference between the computed thermal change amount and the actual thermal change amount as the correction value; and the change amount correction unit corrects the computed thermal change amount by adding to or subtracting from the correction value.

12. The thermal change amount computation apparatus according to claim 9, wherein:

the actual value detecting unit includes a detector for detecting the machining unit when the machining unit is relatively moved to a predetermined position relative to the workpiece, and a moving mechanism for moving the machining mechanism to the predetermined position by controlling the driving mechanism; and the actual thermal change amount is detected based on a comparison between a driving amount of the driving mechanism required by the moving mechanism to relatively move the machining mechanism to the predetermined position and a driving amount required when a thermal change is not generated in the machine tool.

13. The thermal change computation apparatus according to claim 12, wherein:

the actual value detecting unit detects the actual thermal change amount after a lapse of predetermined time from a start of driving the machine tool; and the correction value computing unit computes the correction value at every detection of the actual thermal change amount and updates the correction value memorized in the correction value memory.

14. The thermal change amount computation apparatus according to claim 1, further comprising:

an actual value detecting unit for detecting an actual thermal change amount of the machine tool;

a determination unit for determining whether the actual thermal change amount is necessary to be detected; and selecting unit for selecting the computed thermal change amount and the detected actual thermal change amount in response to a negative determination and an affirmative determination of the determination unit, respectively, wherein the actual value detecting unit is disabled to detect the actual thermal change amount in response to the negative determination of the determination unit.

15. The thermal change amount computation apparatus according to claim 1, further comprising:

an actual value detecting unit for detecting an actual thermal change amount of the machine tool;

a correction value computing means for computing a correction value for the computed thermal change amount by comparing the computed thermal change amount and the detected actual thermal change;

a determination unit for determining whether the actual thermal change amount is necessary to be detected; and selecting unit for selecting the computed thermal change amount and the detected actual thermal change amount in response to a negative determination and an affirmative determination of the determination unit, respectively, wherein, in response to the negative determination of the determination unit, the actual value detecting unit is disabled to detect the actual thermal change amount and the correction value computing unit is disabled to compute the correction value.

16. A storage medium for memorizing a computer-readable program for executing the processing of:

detecting a driving state of a machine tool;

computing a thermal change amount of the machine tool based on the detected driving state at every predetermined unit operation; and computing a present thermal change amount of the machine tool by adding an influence of the thermal change amount previously computed to the thermal change amount newly computed when the previously computed thermal change amount is available.

17. A storage medium for memorizing a computer-readable program for use with a machine tool including a machining mechanism for machining a workpiece and a driving mechanism for changing a relative position between the machining mechanism and the workpiece, the storage medium memorizing the processing of:

detecting a driving state of the machine tool;

computing, based on the detected driving state, a movement distance in which the driving mechanism moves the machining mechanism or the workpiece per unit time;

computing a saturated thermal change amount as a maximum value of a thermal change of the machine tool when a similar driving state is continued based on the computed movement distance with reference to a data map representing a corresponding relationship between the movement distance and the saturated thermal change amount, the data map being set such that a degree in which the saturated thermal change amount increases is changed relative to an increase of the movement distance based on a magnitude of the movement distance; and computing a thermal change amount of the machine toll based on the computed saturated thermal change amount and a driving time of the machine tool.

18. A storage medium for memorizing a computer-readable program for use with a machine tool including a machining mechanism for machining a workpiece and a driving mechanism for changing a relative position between the machining mechanism and the workpiece, the storage medium memorizing the processing of:

detecting an actual value of a thermal change amount of a machine tool;

detecting a driving state of the machine tool;

computing thermal change amount based on the detected driving state;

computing a correction value for the computed thermal change amount comparing the computed thermal change amount and the detected actual thermal change amount;

memorizing the computed correction value; and correcting the computed thermal change amount by using the memorized correction value.

19. A storage medium for memorizing a computer-readable program for use with a machine tool, the storage medium memorizing the processing of:

detecting a driving state of the machine tool;

computing thermal change amount based on the detected driving state;

detecting an actual thermal change amount of the machine tool;

determining whether the actual thermal change amount is necessary to be detected;

selecting the computed thermal change amount and the detected actual thermal change amount in response to a negative determination and an affirmative determination of the determining processing, respectively; and disabling the actual thermal change amount detecting processing in response to the negative determination of the determining processing.

20. A storage medium for memorizing a computer-readable program for use with a machine tool, the storage medium memorizing the processing of:

detecting a driving state of the machine tool;

computing a thermal change amount based on the detected driving state;

detecting an actual thermal change amount of the machine tool;

computing a correction value for the computed thermal change amount by comparing the computed thermal change amount and the detected actual thermal change;

determining whether the actual thermal change amount is necessary to be detected;

selecting the computed thermal change amount and the detected actual thermal change amount in response to a negative determination and an affirmative determination of the determining processing, respectively; and disabling the actual value detecting processing and the correction value computing processing in response to the negative determination of the determining processing.

21. A process for determining a thermal change amount for a machine tool, comprising the steps of:

detecting a driving state of a machine tool;

computing a thermal change amount of the machine tool based on the detected driving state at every predetermined unit operation; and computing a present thermal change amount of the machine tool by adding an influence of the thermal change amount previously computed to the thermal change amount newly computed when the previously computed thermal change amount is available.

22. A process for determining a thermal change amount for a machine tool, comprising the steps of:

detecting a driving state of the machine tool;

computing, based on the detected driving state, a movement distance in which the driving mechanism moves the machining mechanism or the workpiece per unit time;

computing a saturated thermal change amount as a maximum value of a thermal change of the machine tool when a similar driving state is continued based on the computed movement distance with reference to a data map representing a corresponding relationship between the movement distance and the saturated thermal change amount, the data map being set such that a degree in which the saturated thermal change amount increases is changed relative to an increase of the movement distance based on a magnitude of the movement distance; and computing a thermal change amount of the machine tool based on the computed saturated thermal change amount and a driving time of the machine tool.

23. A process for determining a thermal change amount for a machine tool, comprising the steps of:

detecting an actual value of a thermal change amount of a machine tool;

detecting a driving state of the machine tool;

computing thermal change amount based on the detected driving state;

computing a correction value for the computed thermal change amount comparing the computed thermal change amount and the detected actual thermal change amount;

memorizing the computed correction value; and correcting the computed thermal change amount by using the memorized correction value.

24. A process for determining a thermal change amount for a machine tool, comprising the steps of:

detecting a driving state of the machine tool;

computing thermal change amount based on the detected driving state;

detecting an actual thermal change amount of the machine tool;

a determination unit for determining whether the actual thermal change amount is necessary to be detected;

selecting the computed thermal change amount and the detected actual thermal change amount in response to a negative determination and an affirmative determination of the determining processing, respectively; and disabling the actual thermal change amount detecting processing in response to the negative determination of the determining processing.

25. A process for determining a thermal change amount for a machine tool, comprising the steps of:

detecting a driving state of the machine tool;

computing a thermal change amount based on the detected driving state;

detecting an actual thermal change amount of the machine tool;

computing a correction value for the computed thermal change amount by comparing the computed thermal change amount and the detected actual thermal change;

determining whether the actual thermal change amount is necessary to be detected;

selecting the computed thermal change amount and the detected actual thermal change amount in response to a negative determination and an affirmative determination of the determining processing, respectively; and disabling the actual value detecting processing and the correction value computing processing in response to the negative determination of the determining processing.

* * * * *